I. P. BERTHRONG.
DOSE INDICATOR.
APPLICATION FILED MAY 24, 1913.

1,091,114.

Patented Mar. 24, 1914.

UNITED STATES PATENT OFFICE.

ITHAMAR P. BERTHRONG, OF WASHINGTON, DISTRICT OF COLUMBIA.

DOSE-INDICATOR.

1,091,114.  Specification of Letters Patent.  Patented Mar. 24, 1914.

Application filed May 24, 1913. Serial No. 769,704.

*To all whom it may concern:*

Be it known that I, ITHAMAR P. BERTHRONG, citizen of the United States, residing at Washington, in the District of Columbia, have invented new and useful Improvements in Dose-Indicators, of which the following is a specification.

My present invention pertains to medicine dose indicators such as are adapted to form a cover for a glass or other receptacle and serve as a rest for a spoon; and it has for its object to provide a dose indicator, of the type stated, embodying such a construction that the spoon employed in administering a dose can be utilized as a pointer to indicate when the subsequent dose is to be administered, and this without the employment of elements other than the indicator body and the spoon.

Figure 1:
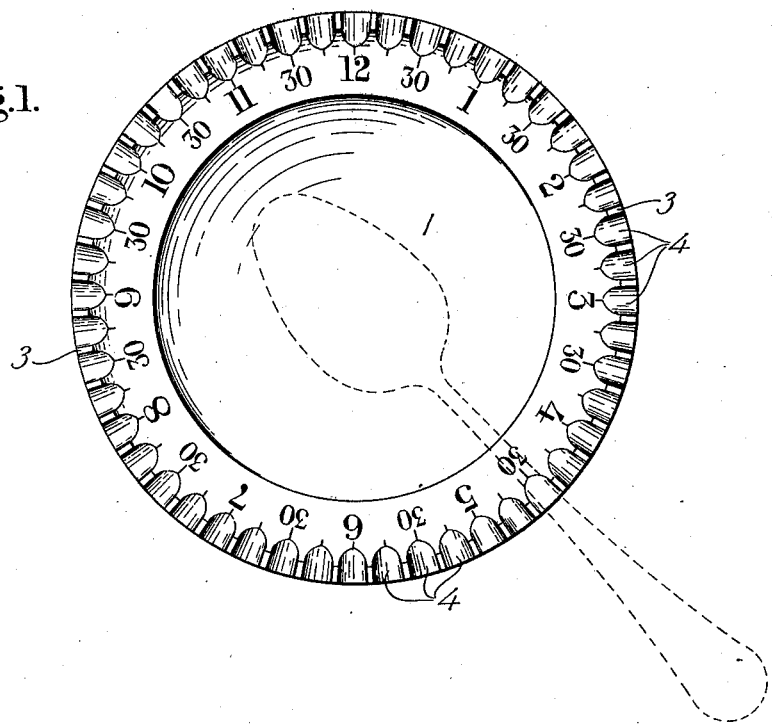
Figure 2:
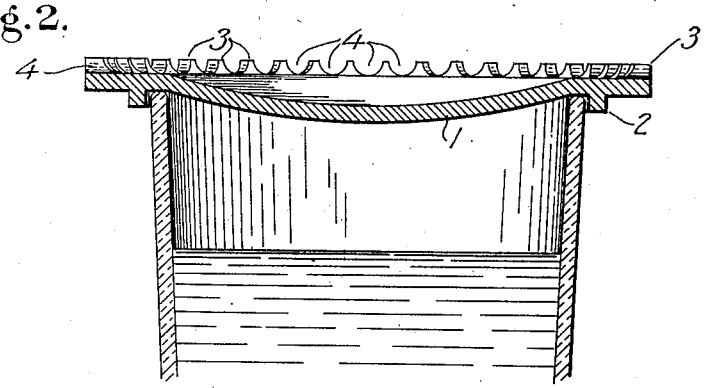

With the foregoing in mind the invention will be fully understood from the following description and claims when the same are read in connection with the drawings, accompanying and forming part of this specification, in which:

Figure 1 is a plan view of my novel indicator; a spoon being illustrated by dotted lines in proper position thereon to serve as a pointer. Fig. 2 is a diametrical section illustrating the indicator as properly positioned on a glass, and with the spoon omitted.

Similar numerals of reference designate corresponding parts in all of the views of the drawings.

The body 1 of my novel indicator may be made of any material compatible with its purpose without involving departure from the scope of my claimed invention. The said body 1 is circular in form and is provided at about the point shown with a depending annular flange 2 which is designed to coöperate with the upper end of a glass or other receptacle and prevent casual edgewise displacement of the body from the glass. The central portion of the body 1 is preferable, though not necessarily, concavo-convex, the concave upper side of the said portion being designed to seat and retain the bowl of a conventional spoon. Rising from the body 1 is an integral flange 3 which is preferably a marginal flange as illustrated, and is notched at intervals as indicated by 4. The annular portion of the upper side of the body 1 intermediate the concavity and the flange 3 is utilized as a dial face, and on the same are arranged in any approved manner figures indicating the hours and fractions of hours of the day; the said figures being arranged in proper sequence and each figure or pair of figures being arranged opposite one of the notches 4 in the flange 3.

In practice my novel indicator is preferably used as a cover for a glass or receptacle containing medicine to be administered, and when so used the indicator serves to prevent evaporation of the medicine and also serves to exclude dust and other foreign substances therefrom. When a dose of the medicine is administered, and another dose is to be administered say an hour after the first dose, the spoon used in administering the dose is arranged on the body of the indicator in such manner that its handle rests in the notch 4 opposite the appropriate figure of the dial. When the spoon is thus arranged it serves as a pointer to indicate the time when the next dose is to be given; and it will be understood in this connection that the handle of the spoon may be seated in any one of the notches of the flange 3 to denote the time of administering a dose that is to be given.

It will be appreciated from the foregoing that my novel device is susceptible of being very cheaply produced, inasmuch as it can be made of a single piece of material and does not comprise any extraneous features for coöperating with a spoon to hold the same and admit of the spoon being utilized as a pointer.

As will be observed by reference to Fig. 2 the inner edge of the flange 3 is concave in cross-section. By virtue of this it will be observed that when V-shaped notches are formed in the said flange 3 the inner extremities of the said notches will be pointed and directed toward their respective dial figures.

Having described my invention, what I claim and desire to secure by Letters-Patent is:

1. As a new article of manufacture, a glass cover and medicine-dose indicator having a central concavity to receive and support a spoon bowl, and an upstanding flange surrounding the concavity, in which flange are seats to receive a spoon handle, and also having dial figures arranged adjacent the seats in the flange.

2. As a new article of manufacture, a glass cover and medicine-dose indicator having a central portion to support a spoon bowl, and an upstanding annular flange surrounding the said central portion, in which flange are seats to receive a spoon handle, and also having dial figures arranged adjacent the seats in the flange.

3. As a new article of manufacture, a glass or receptacle cover and medicine-dose indicator having a central portion to support a spoon bowl, and a plurality of seats for a spoon handle grouped about the central portion, and also having dial figures arranged adjacent the said seats.

In testimony whereof I have hereunto set my hand in presence of two subscribing witnesses.

ITHAMAR P. BERTHRONG.

Witnesses:
CHARLES J. HELM,
J. T. SHADLE.

Copies of this patent may be obtained for five cents each, by addressing the "Commissioner of Patents, Washington, D. C."